US010254937B2

(12) United States Patent
Hilbrink et al.

(10) Patent No.: US 10,254,937 B2
(45) Date of Patent: Apr. 9, 2019

(54) GRAPHICAL USER INTERFACE AND DATA TRANSFER METHODS IN A CONTROLLING DEVICE

(71) Applicant: UNIVERSAL ELECTRONICS INC., Santa Ana, CA (US)

(72) Inventors: Marcel Hilbrink, Singapore (SG); Rex Xu, Tustin, CA (US); Cesar Alvarado, Orange, CA (US); Paul D. Arling, Irvine, CA (US); Patrick H. Hayes, Mission Viejo, CA (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 0 days.

(21) Appl. No.: 15/832,166

(22) Filed: Dec. 5, 2017

(65) Prior Publication Data
US 2018/0095642 A1  Apr. 5, 2018

Related U.S. Application Data

(63) Continuation of application No. 14/535,957, filed on Nov. 7, 2014, now Pat. No. 9,851,879, which is a
(Continued)

(51) Int. Cl.
*H04N 21/422* (2011.01)
*G06F 3/0484* (2013.01)
(Continued)

(52) U.S. Cl.
CPC ......... *G06F 3/04842* (2013.01); *G05B 15/02* (2013.01); *G06F 3/0482* (2013.01);
(Continued)

(58) Field of Classification Search
CPC ............... G06F 3/04842; G06F 3/0484; G06F 3/04886; H04N 21/4126; H04N 21/42204
See application file for complete search history.

(56) References Cited

U.S. PATENT DOCUMENTS 7,548,246 B2    6/2009  Huang et al.
7,627,825 B2 *  12/2009 Kakuda ................. G08C 19/28
                                            715/744
(Continued)

FOREIGN PATENT DOCUMENTS

WO    2007024271    3/2007
WO    2011008387    1/2011

OTHER PUBLICATIONS

European Patent Office, Extended Search Report on PCT/US2011/066371, dated Apr. 3, 2014, 8 pgs.
(Continued)

*Primary Examiner* — Omar R Abdul-Ali
(74) *Attorney, Agent, or Firm* — Greenberg Traurig, LLP

(57) ABSTRACT

A smart device is provided with a main remote control application that may be configured using information. The main remote control application may present images of original remote controls corresponding to devices which are controllable by the configured main remote control application. In connection with a presented image of an original remote control, the display may present icons that are representative of a subset of the buttons of the original remote control. The user interface also allows a user to select amongst the images of the original remote controls to change which appliances are to be controlled via the user interface. A pop-up remote control widget may also be provided which may be invoked without switching to the main remote control application provisioned on the smart device.

6 Claims, 7 Drawing Sheets

Related U.S. Application Data continuation of application No. 13/329,940, filed on Dec. 19, 2011, now Pat. No. 8,918,719.

(60) Provisional application No. 61/442,488, filed on Feb. 14, 2011.

(51) Int. Cl.

| | | |
|---|---|---|
| *G06F 3/0488* | (2013.01) | |
| *H04N 21/41* | (2011.01) | |
| *H04N 21/4223* | (2011.01) | |
| *H04N 21/485* | (2011.01) | |
| *H04N 21/81* | (2011.01) | |
| *G06F 17/30* | (2006.01) | |
| *G06F 3/0481* | (2013.01) | |
| *G06F 3/0485* | (2013.01) | |
| *G05B 15/02* | (2006.01) | |
| *G06F 3/0482* | (2013.01) | |

(52) U.S. Cl.
CPC .......... *G06F 3/0484* (2013.01); *G06F 3/0485* (2013.01); *G06F 3/04817* (2013.01); *G06F 3/04886* (2013.01); *G06F 17/30* (2013.01); *H04N 21/4126* (2013.01); *H04N 21/4223* (2013.01); *H04N 21/42204* (2013.01); *H04N 21/485* (2013.01); *H04N 21/8173* (2013.01)

(56) References Cited

U.S. PATENT DOCUMENTS

| | | | | |
|---|---|---|---|---|
| 8,640,031 B2* | 1/2014 | Kim | ...................... | H04L 12/282 |
| | | | | 715/734 |
| 2003/0103088 A1* | 6/2003 | Dresti | ................... | G06F 3/0481 |
| | | | | 715/835 |
| 2003/0169231 A1 | 9/2003 | Rekimoto | | |
| 2003/0234737 A1 | 12/2003 | Nelson | | |
| 2004/0056789 A1 | 3/2004 | Arling et al. | | |
| 2004/0257259 A1 | 12/2004 | Jindal | | |
| 2004/0266419 A1 | 12/2004 | Arling et al. | | |
| 2005/0080496 A1* | 4/2005 | Hayes | ................... | G06F 1/1626 |
| | | | | 700/65 |
| 2006/0050142 A1 | 3/2006 | Scott et al. | | |
| 2006/0259864 A1* | 11/2006 | Klein | ................... | G06F 3/0481 |
| | | | | 715/738 |
| 2007/0271267 A1 | 11/2007 | Lim et al. | | |
| 2008/0168367 A1 | 7/2008 | Chaudhri et al. | | |
| 2009/0239587 A1* | 9/2009 | Negron | ............... | G06F 3/04883 |
| | | | | 455/566 |
| 2009/0298535 A1 | 12/2009 | Klein et al. | | |
| 2009/0320070 A1 | 12/2009 | Inoguchi | | |
| 2010/0017736 A1* | 1/2010 | Kim | ...................... | G08C 17/02 |
| | | | | 715/771 |
| 2010/0053461 A1 | 3/2010 | Lad et al. | | |
| 2010/0081375 A1* | 4/2010 | Rosenblatt | ............. | G08C 17/02 |
| | | | | 455/41.1 |
| 2010/0275135 A1 | 10/2010 | Dunton et al. | | |
| 2010/0332979 A1 | 12/2010 | Xu et al. | | |
| 2011/0007018 A1 | 1/2011 | McKinley et al. | | |
| 2017/0317879 A1* | 11/2017 | Wei | ...................... | G06F 13/385 |

OTHER PUBLICATIONS

The Intl. Bureau of WIPO, International Preliminary Report, Written Opinion on Patentability and Search Report issued on PCT/US11/066371, issued Oct. 10, 2013, completed/dated Jun. 12, 2012, 9 pgs.

U.S. Patent and Trademark Office, Non-Final Office Action issued on U.S. Appl. No. 15/785,795, dated Oct. 17, 2018, 6 pgs.

U.S. Patent and Trademark Office, Non-Final Office Action issued on U.S. Appl. No. 15/785,954, dated Dec. 31, 2018, 6 pgs.

* cited by examiner

— 602

SONY:TV:XBR 42HSX3567:serial 23us4562233498:UID T0000:Terr USA:HDMI 3:CVID 3:USB 2+2::

604   606  608   610

— 620

TV:SONY:T0000;STB:MOTOROLA:C0476;DVD:SAMSUNG:Y0891;AVR:SONY:R0158;
622

Activity:Watch TV:T,S,R;Activity:Watch movie:T,Y,R;
624

Favorite:C:NBC:704;Favorite:C:ABC:707;Favorite:C:ESPN:715;;
626

GRAPHICAL USER INTERFACE AND DATA TRANSFER METHODS IN A CONTROLLING DEVICE

RELATED APPLICATION INFORMATION

This application claims the benefit of and is a continuation of U.S. application Ser. No. 14/535,957, filed on Nov. 7, 2014, which application claims the benefit of and is a continuation of U.S. application Ser. No. 13/329,940, filed on Dec. 19, 2011, which application claims the benefit of U.S. Provisional Patent Application No. 61/442,488 filed Feb. 14, 2011, the disclosures of which are incorporated herein by reference in its entirety.

BACKGROUND

Personal communication, productivity, and entertainment devices such as tablet computers, smart phones, portable email devices, e-books, hand-held games and/or game controllers, portable media players, etc. (all referred to hereafter as "smart devices") are known to include features such as graphical user interfaces on color touch screens, wireless Internet capability, and support for ancillary applications (sometimes referred to as "apps") such as, for example, calendars, email, maps and navigation, etc. Such ancillary applications may be pre-installed in a smart device or may be made available for download by a user. Certain such apps may comprise an ability to issue commands to entertainment and other appliances, for example to offer the features and functionality of a universal remote control, to operate in conjunction with a TV guide display to enable channel selection, etc. Typically such remote control apps may be provisioned with a library of command data and protocols suitable for controlling a plurality of appliances of different type and/or manufacture (a so-called "universal remote"). Such a command library and the hardware necessary to transmit operational commands to appliances may be incorporated into or made available to the smart device itself, or may take the form of a separate external device which is placed in communication with the smart device (i.e., a relay device or so-called "blaster"). After initial installation and configuration of such a smart device app, a GUI may be provided by means of which a user may be enabled to issue operational commands to the configured appliances. Disclosed herein are user-friendly and convenient GUI methods for facilitating command input and for transferring configuration data between smart devices.

SUMMARY

The following relates generally to remote control systems and, more particularly, to methods for presenting a GUI on a portable device, e.g., a smart device which may incorporate universal remote control functionality to command operation of one or more types of remotely controllable appliances of one or more manufacturers. Exemplary smart devices include but are not limited to Apple's "iPhone" and "iPad," Google's "Android" platform, Nintendo's "Wii U" controller, Blackberry's "Torch" or "PlayBook," and various other tablet computers and/or smart phones. Exemplary types of appliances include, but are not limited to televisions, digital video disc players (DVDs), cable or satellite set top boxes (STBs), digital video recorders (DVRs), audio video (AV) receivers, thermostats, game consoles, lighting systems, etc.

In one described aspect, a smart device remote control application may be furnished with a touch screen GUI the activatable icons of which approximate the layout of the target appliances original equipment remote control. Since differences in keypad size, form factor, or GUI aesthetics may necessitate that only a portion of the replicated keypad can be displayed at any one time, a user may be provided with a means to scroll within the GUI display. Separately or in conjunction with this feature, user selection of a particular target device to control, e.g. TV, DVD, STB, etc., may be made using a slide-out or pull-down menu comprising images representative of original equipment remote controls.

In another described aspect, provision may be made in a smart device remote control app for a quick loading mini control panel comprising frequently used control functions, such as for example those associated with volume control, which may be invoked by a user without necessitating a loading of the full remote control GUI or interruption of other currently running apps.

In a yet further described aspect, a remote control app, once installed and configured in a first smart device, may be enabled to display a matrix barcode, such as for example a so-called Quick Response Code or "QR code" containing the remote control apps current configuration data. This displayed matrix barcode may then be photographed, optically recognized, or otherwise captured by a second smart device in order to rapidly and conveniently configure a remote control app resident in said second smart device to match the configuration of the remote control app of the first smart device.

A better understanding of the objects, advantages, features, properties and relationships of the various aspects described hereinafter will be obtained from the following detailed description and accompanying drawings which set forth illustrative embodiments and which are indicative of the various ways in which the principles of the invention claimed hereinafter may be employed.

BRIEF DESCRIPTION OF THE DRAWINGS

For a better understanding of the claimed invention, reference may be had to preferred embodiments shown in the attached drawings in which:

DETAILED DESCRIPTION

Figure 1:
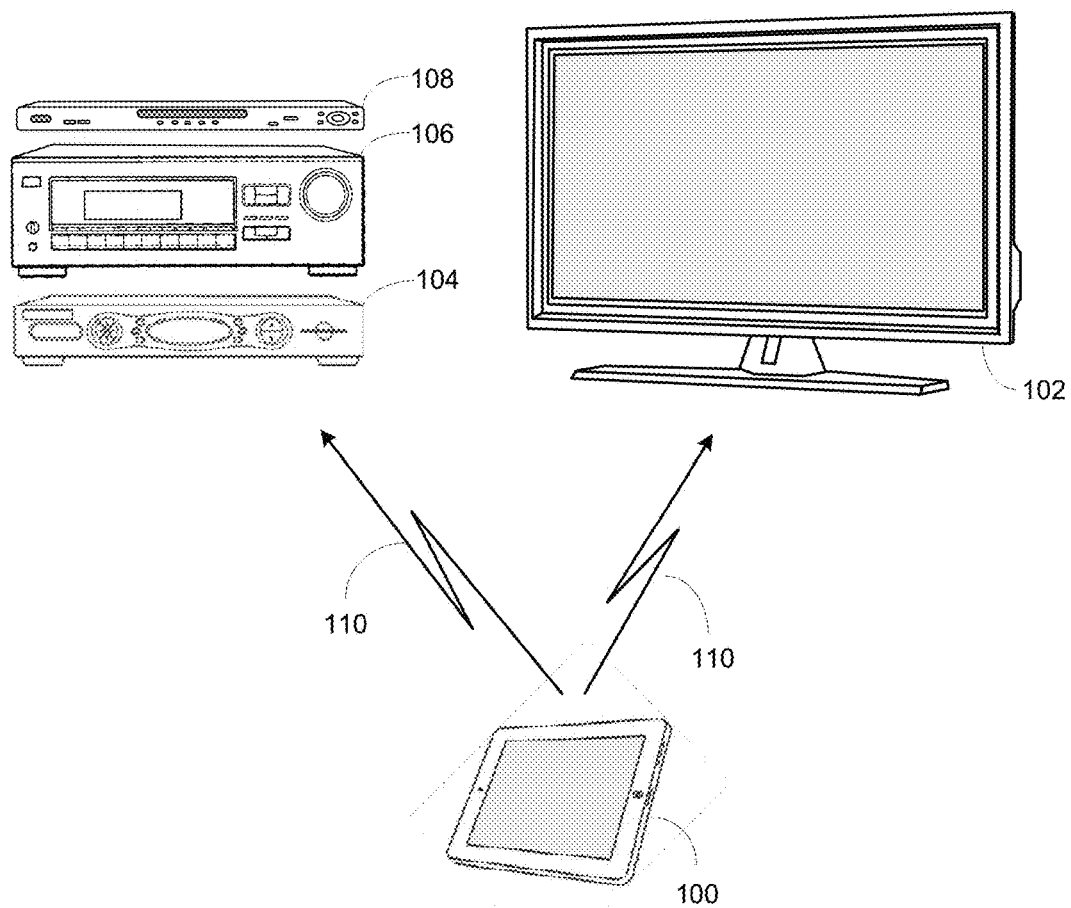
FIG. 1 illustrates an exemplary system in which a smart device equipped with a remote control app constructed according to the description that follows may be used.

By way of example, FIG. 1 illustrates an exemplary system wherein a smart device 100 may be adapted to issue commands to controllable appliances such as a TV 102, a set top box (STB) 104, an audio/video receiver (AVR) 106, a DVD player 108, etc. While illustrated in the context of a home entertainment system comprising a TV, STB, AVR and DVD player, it is to be understood that controllable appliances may include, but need not be limited to, televisions, VCRs, DVRs, DVD players, cable or satellite converter set-top boxes ("STBs"), amplifiers, AV receivers, CD players, game consoles, home lighting, drapery, fans, HVAC systems, thermostats, personal computers, etc. In the illustrative example of FIG. 1, a smart device 100 may include both a universal remote control app and the necessary hardware to enable direct transmission of commands to appliances 102 through 108, for example without limitation the technology described in co-pending U.S. patent application Ser. No. 13/043,915 which is incorporated herein by reference in its entirety. Appliance commands may be issued in the form of infrared signals 110 as illustrated, or in any other suitable format, e.g., via an RF signal such as contemplated by RF4CE, Zwave, Bluetooth, etc.; ultrasonic signal; visible light; etc. as appropriate for the control of each particular appliance. In alternative embodiments appliance commands may be issued indirectly via a proxy, or relay device, which is responsive to wireless communications received from the universal remote control app resident in smart device 100, for example as described in co-pending U.S. patent application Ser. No. 13/071,661 or 13/328,416, which are also incorporated herein by reference in their entirety. Since the techniques and methods described herein are equally applicable to either embodiment, these will be described hereafter with reference to the system of FIG. 1, it being understood that these may be applied mutatis mutandis to other embodiments which may utilize a relay device for issuance of appliance commands.

Figure 2:
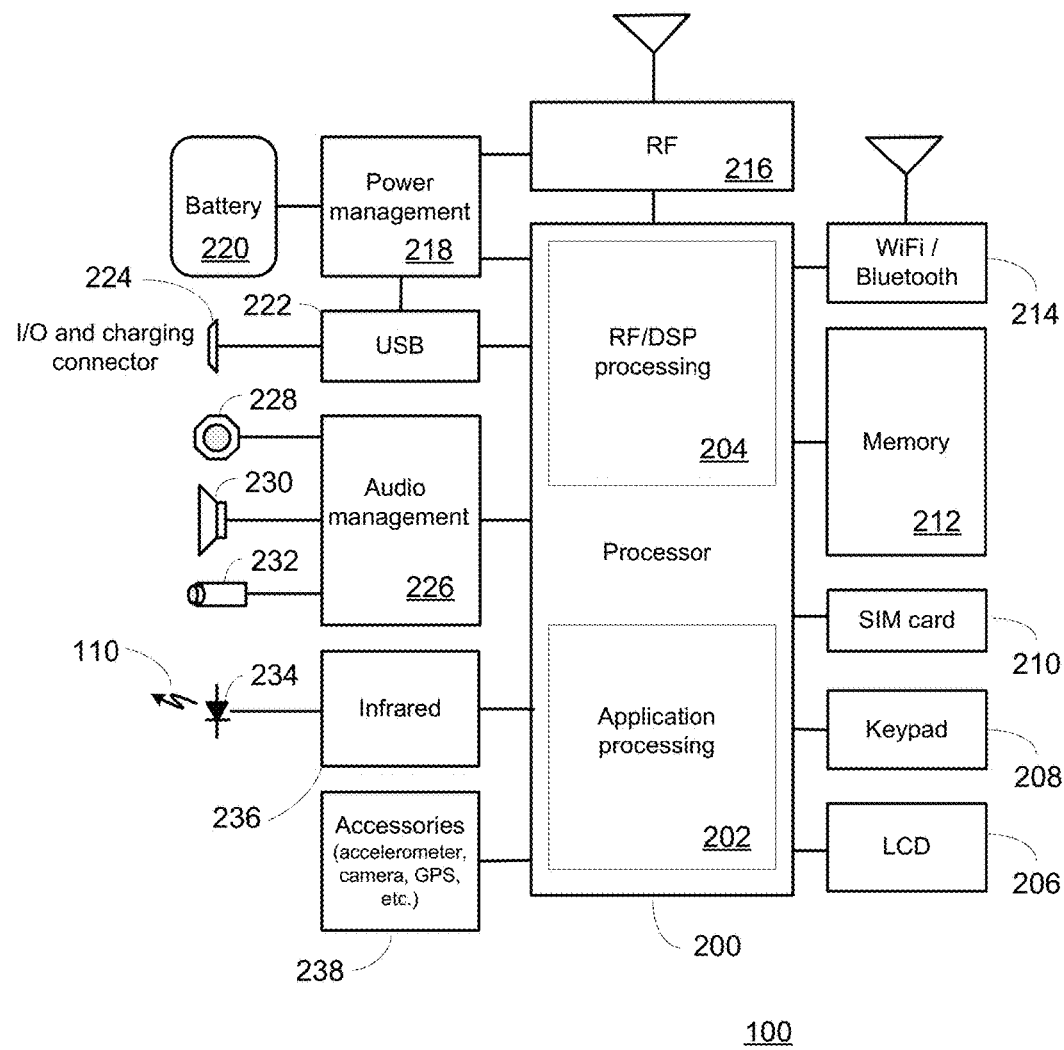
FIG. 2 illustrates in block diagram form the major components of the exemplary smart device of FIG. 1.

With reference to FIG. 2, as is known in the art, a smart phone device 100 may include as needed for a particular application, processing means 200 which may comprise both an application processing section 202 and an RF/DSP processing section 204; an LCD display 206; a keypad 208 which may comprise physical keys, touch keys overlaying LCD 206, or a combination thereof; a subscriber identification module (SIM) card 210; memory means 212 which may comprise ROM, RAM, Flash, or any combination thereof; WiFi and/or Bluetooth wireless interface(s) 214; a wireless telephony interface 216; power management circuitry 218 with associated battery 220; a USB interface 222 and connector 224; an audio management system 226 with associated microphone 228, speaker 230, and headphone jack 232; optional IR communication means comprising a transmitter and/or receiver 236 with associated IR output diode(s) 234; and various optional accessory features 238 such as a digital camera, GPS, accelerometer, etc.

A remote control app resident in such a smart device may draw on a library of codes and data suitable for commanding the functional operations of various types of appliances of multiple manufactures and/or models, i.e., a library of remote control codesets for a so-called "universal" controller, as well known in the art. Upon initial installation, the remote control app may be provisioned with the specific command data and protocol ("codeset") to which each of the to-be-controlled appliances is responsive. As is known in the art, this may take the form of a pointer or index into a library of codesets pre-stored locally in the memory 212 of smart device 100 or of a relay device; individual codesets downloaded to those devices during a configuration process; an item-by-item download of individual commands from a codeset on an as-required basis from a library stored locally on a PC or on an appliance such as STB 104 or TV 102, or stored remotely at a headend or internet accessible server; etc. Since methods to accomplish the identification of suitable commands and/or codesets for controlled appliances are well known in the art, for the sake of brevity these will not be further described herein. Nevertheless, for more information in this regard the interested reader may turn to, for example, co-pending U.S. patent application Ser. Nos. 13/198,072, 13/198,172, or 13/240,604, all of common ownership and all incorporated herein by reference in their entirety.

In keeping with the objectives of subject disclosure, identification and provisioning of appliance command codesets may include a provisioning of appropriate image elements and data for use in presenting the GUI displays described herein. As will become apparent, such image elements and data may include pictures, simulacrums, graphics, layout information, key position maps, etc. as necessary to create graphical representations of each appliance's original equipment remote control. Such data may be retrieved together with the command codesets, or may be available from an independent source such as a Web service which may be separately accessed by the smart device remote control app once an exact appliance identity has been established, as appropriate for a particular embodiment.

Figure 3:
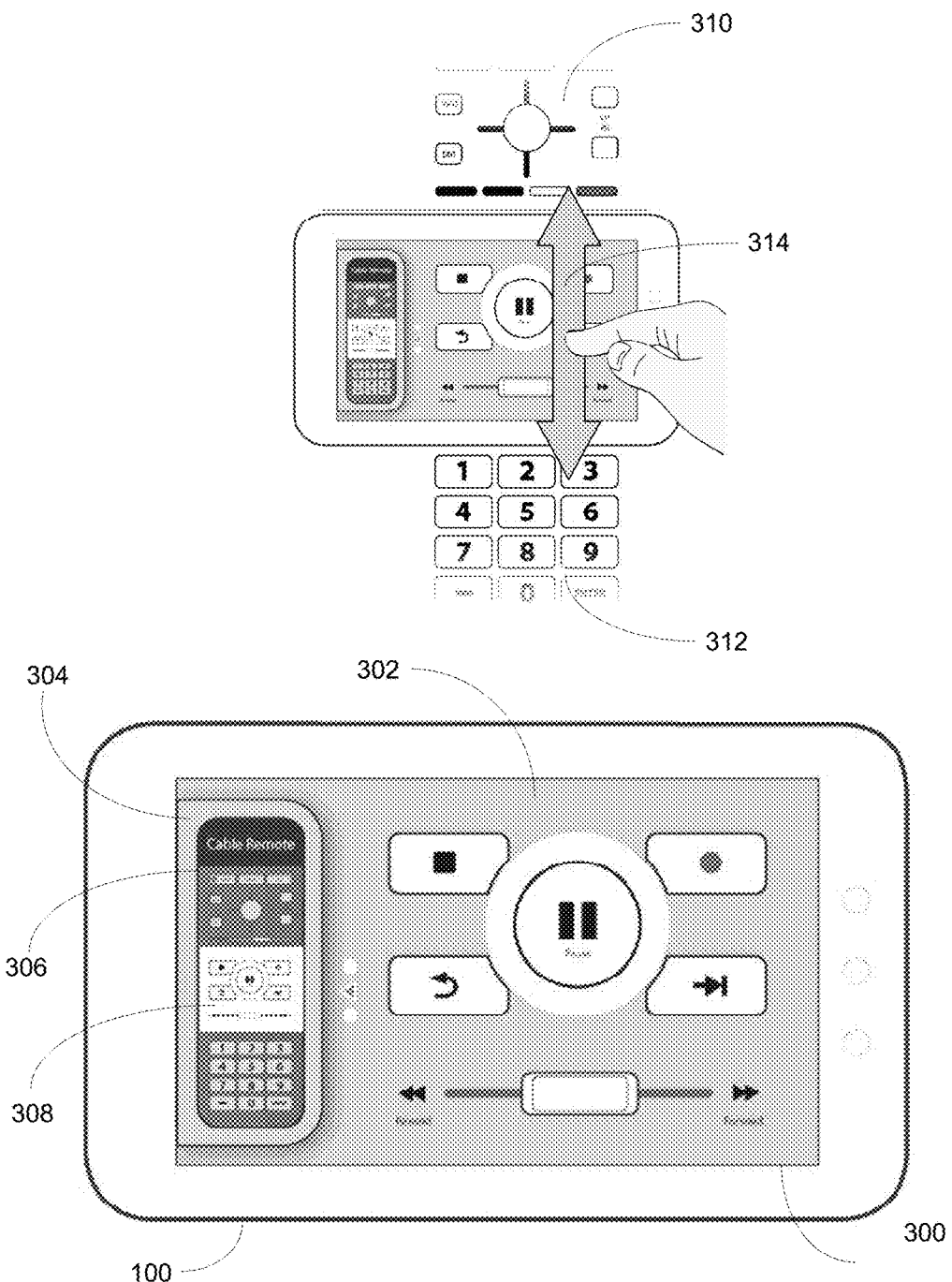
FIG. 3 illustrates an exemplary smart device GUI for use in issuing commands to controlled appliances.

With reference to FIG. 3, when a smart device remote control app in accordance with the invention described herein is invoked, it may display a GUI 300 which may be representative of the original equipment remote control corresponding to the currently selected appliance. As illustrated, GUI 300 may comprise an area 302 containing touch-activated icons arranged in a layout which approximates a portion of the OEM remote control keypad. A second area 304 may contain an image 306 representative of the entire OEM remote control which may serve to identify to the user of the app both which appliance is currently under control (STB 104 in the example presented) and, for example by means of a highlighted area 308, which section of the OEM remote control keypad is currently being displayed in area 302. In order to access other functional areas of the remote control GUI, for example an upper section 310 or lower section 312 of the simulated OEM keypad, the remote control app may be enabled to recognize vertical sliding motions 314 of a user's finger as requests to scroll back and forth within the interface. In some embodiments this input may be recognized only if performed within area 304, while in other embodiments it may recognized when performed anywhere on the touch sensitive surface of smart device 100 (i.e., both areas 302 and 304 of the illustrated example). In yet further embodiments, a finger tap on the desired area of remote control image 306 may be used to select the keys to be presented in area 302, either in place of as an alternate to the sliding motions described above. As the interface scrolls, the highlight area 308 of OEM remote control image 306 may adjust accordingly so as to correspond with the OEM remote control section displayed in area 302.

Figure 4:
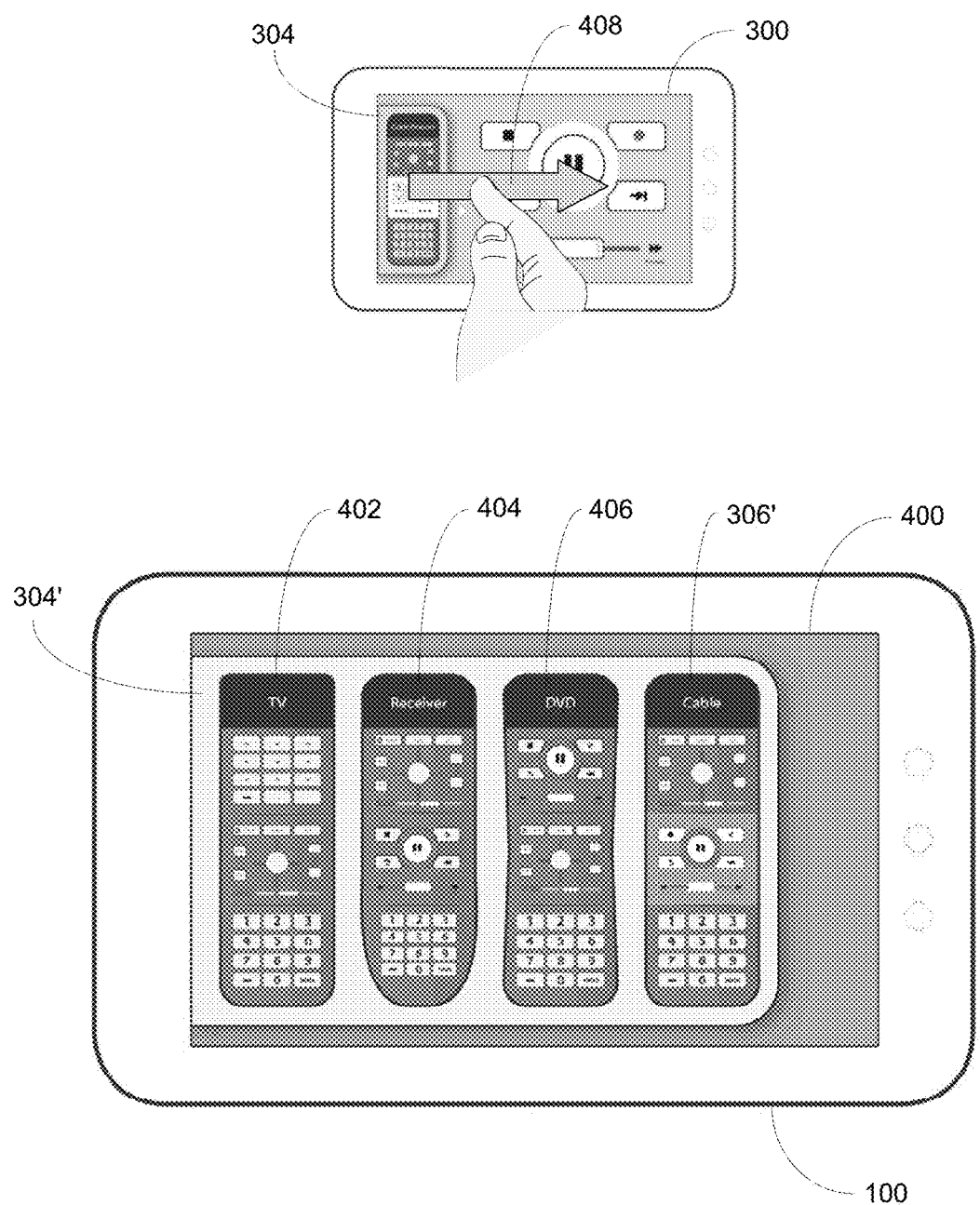
FIG. 4 illustrates an exemplary smart device GUI for use in selecting an appliance to be controlled.

With reference to FIG. 4, in order to permit user selection of different target appliances to be controlled a smart device remote control app may be enabled to recognize a generally horizontal sliding motion 408 of a user's finger commencing within area 304 as a request to change controlled appliance. In response to such a gesture, the remote control app may cause display area 304 to expand horizontally as illustrated at 304' in illustrative display 400. The expanded display in area 304' may comprise representations of the OEM remote controls of the appliances currently configured to be controlled by the remote control app. In the illustrative example these may include image 402 representative of remote control provided with TV 102, image 404 representative of remote control provided with AVR 106, image 406 representative of remote control provided with DVD player 108, and image 306' representative of a remote control provided with STB 104. Selection of the appliance to be controlled may now be conveniently accomplished by way of a finger tap on the image representing a remote control for controlling the desired appliance. Upon selection of an image, the remote control app may automatically return to a state such as illustrated in FIG. 3 with the newly selected remote control device being displayed. Selection of an area of the display screen (or provision of other input that is not recognized as a selection of an image) can also be used to manually return the remote control app to a state such as illustrated in FIG. 3 with the remote control that was displayed upon receiving the generally horizontal input 408 again being displayed. Alternatively, the images presented for selection can be representations of the appliances that are to be controlled via the current configuration of the remote control app in lieu of or together with the images of the remote controls provided with such appliances.

Figure 5:
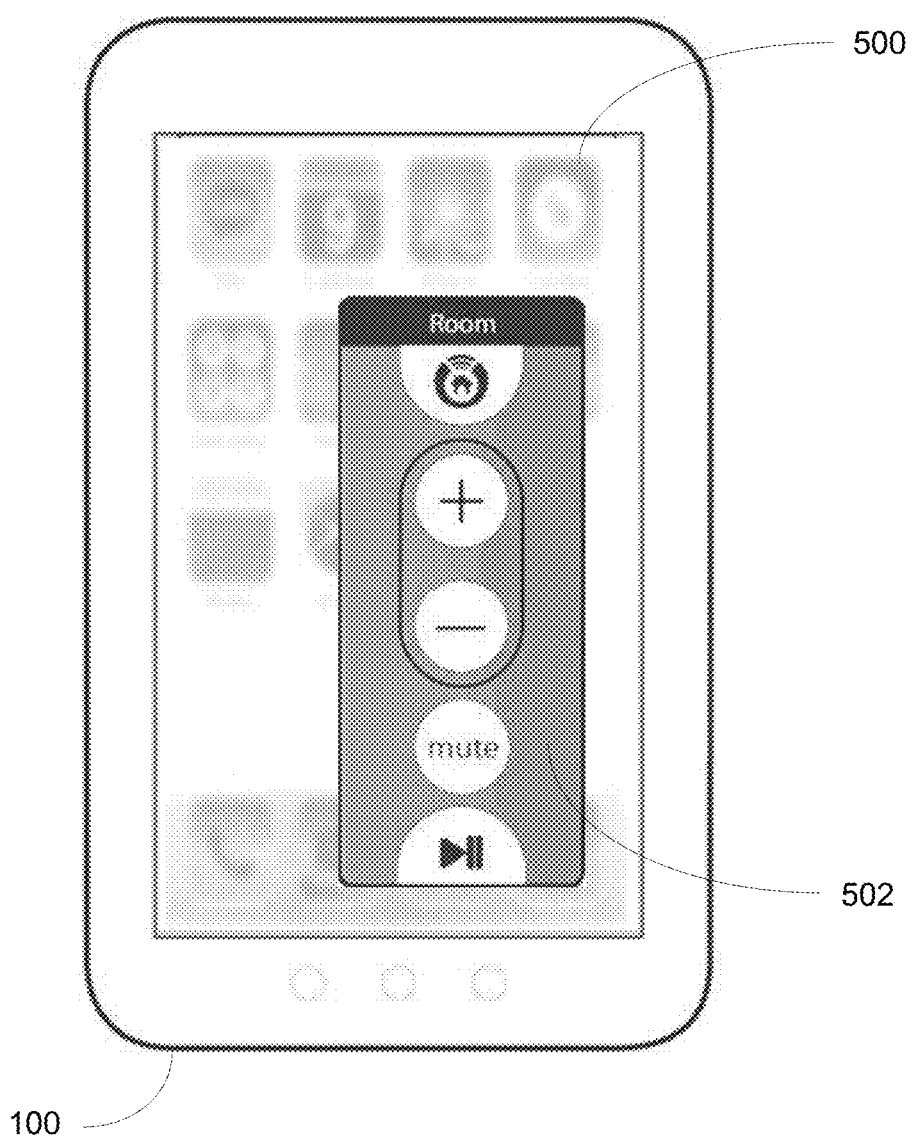
FIG. 5 illustrates an exemplary pop up mini remote control GUI.

In some embodiments, a smart device remote control app may support a user convenience feature in the form of a pop-up remote control widget, for example as illustrated in FIG. 5. Exemplary widget pop-up GUI 502 may comprise a limited set of pre-determined, frequently used appliance command functions, for example providing a user direct access to the five basic functions Home, Volume Up, Volume down, Mute and Play/pause as illustrated. As will be appreciated, a user of the remote control app may be required to configure these pop-up key assignments during the smart device remote control app initial installation process, e.g., by specifying the particular appliance to which each of the basic commands is to be directed, for example TV or AVR for volume functions and STB or DVD for play/pause in the illustrative system of FIG. 1. Once configured, widget GUI 502 may be invoked at any point without switching to the main remote control application, for example by activating an icon provided for that purpose, by a gesture, by motion of the smart device such as shaking or flipping, etc., as appropriate for a particular embodiment. When invoked, the widget GUI 502 may be temporarily superimposed over the current smart device display data 500, for example using a smart device OS feature such the Android operating system "PopupWindow" class. Once the desired appliance adjustments have been made, widget GUI 502 may be returned to the idle state (e.g., a non-displayed state) by repeating the action which invoked it, by touching smart device screen 500 in an area outside of widget display 502, etc., as appropriate. In a further embodiment, the command buttons presented with the widget GUI 502 may be dynamically changed or updated by the remote control app to present only those command buttons that the remote control app determines are most often selected by a user or a known user. To this end, the remote control app would then include a monitoring and counting feature to keep track of command selection by a user or known user (to the extent the widget GUI 502 is to be personalized).

A displayed matrix barcode may also be utilized to conveniently transfer remote control app configuration information from an appliance or computer to a smart device, or to transfer configurations between smart devices. In an illustrative embodiment a standardized matrix barcode such as the Denso Wave "Quick Response" or QR code may be utilized. The QR code format is appropriate for this application since it is scaleable up to a maximum data content of 2,953 bytes and is widely supported by built-in smart device operating systems and image recognition software, both on-board and cloud-based. Since the encoding and decoding techniques utilized in conjunction with QR matrix codes are standardized and widely known, these will not be described in further detail herein. Nevertheless, for additional information on this subject the interested reader may turn to published standards such as for example ISO/IEC publication 18004: *"Information technology—Automatic identification and data capture technique—QR Code 2005 bar code symbology specification."*

Figure 6:
FIG. 6 illustrates exemplary matrix barcodes which may encode configuration information for use by a remote control app of a smart device.
Figure 6:
Figure 7:
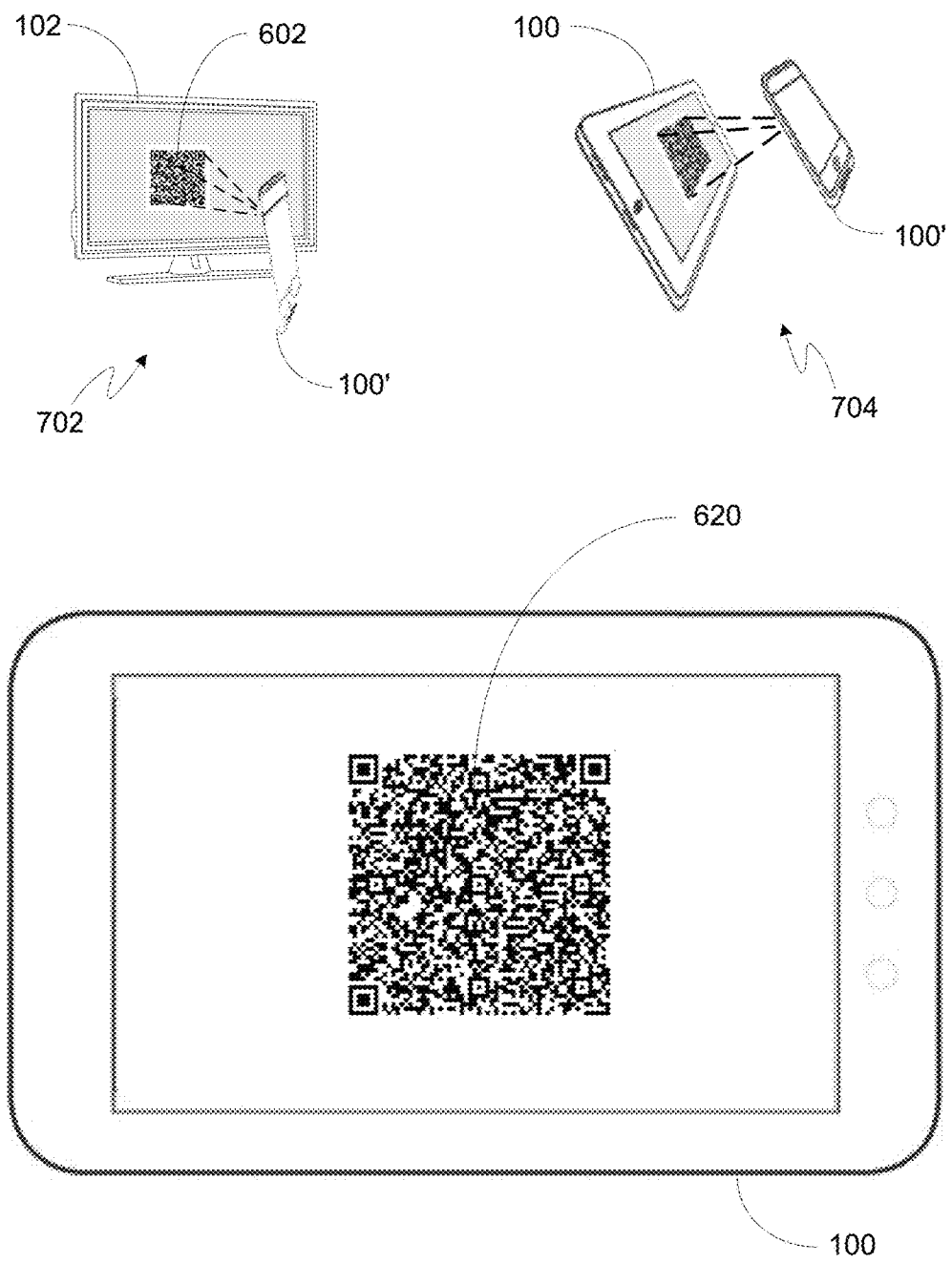
FIG. 7 illustrates exemplary situations in which matrix barcodes such as those of FIG. 6 may be utilized to transfer information to a remote control app of a smart device.

By way of example without limitation, QR codes suitable for use in configuring a smart device remote control app are illustrated in FIGS. 6 and 7, along with a human-readable representation of the data encoded therein. QR code 602, representative of a matrix barcode which may be used to identify a specific controllable appliance to an app resident in smart device 100' as illustrated in example 702 of FIG. 7, may comprise a brand, type, model number, and serial field 604; a command code set identifier 606 (where this is known, if this is not present the applicable command code set may be inferred from the brand model information 604 as is known in the art, for example by reference to a database); territory identification 608 corresponding to the geographic area in which this appliance is marketed (when present, this may be used for example to select a language for icon key captions); and in some embodiments, information regarding available appliance input ports 610.

QR code 620, representative of a larger matrix which may be used to transfer an entire equipment configuration between apps resident in smart devices 100 and 100' as illustrated in example 704 of FIG. 7, or from a PC based setup program to a smart device, may comprise a list of controllable appliances 622 which includes type, brand, and codeset identifiers for each appliance; an activity definition field 624 comprising the identities of the devices which are to participate in various user-defined activity macros; and a favorite channel field 626 which may comprise a listing of broadcast channel identifiers and corresponding channel numbers.

While various concepts have been described in detail, it will be appreciated by those skilled in the art that various modifications and alternatives to those concepts could be developed in light of the overall teachings of the disclosure. For example, in an alternate embodiment, actual photographic images of OEM remote controls may be used in place of the graphic representations depicted herein. In such instances, it will be appreciated that some or all of said photographic images may be captured by a user of the smart device, for example using a built-in camera. In other embodiments, images representative of the appliance themselves may be used in place of OEM remote images when selecting an appliance to be controlled. Furthermore, it will be appreciated that optical transfer of setup and configuration information to and between smart device remote control apps or other controlling devices may be accomplished via any convenient standard or proprietary optical image encoding system, for example without limitation the EIA Data Matrix code, Aztec Code, Siemens Data Matrix, etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, computer-readable media having stored thereon instructions which, when executed by a processing device of a first smart device having a first remote control application installed thereon, perform steps comprising:

receiving into the first smart device a first data, wherein the first data provided to the first smart device is used by the first remote control application to configure the first remote control application to use at least a first command code set to transmit commands to at least a first intended target appliance;

receiving into the first smart device a second data, wherein the second data provided to the first smart device is used by the first remote control application to assign to one or more input elements displayable in a display of the first smart device by the first remote control application one or more commands selected from the at least the first command code set; and in response to a predetermined input being provided to the first smart device, causing the first remote control application to use the first data and the second data to display a machine readable code in the display of the first smart device, wherein the displayed machine readable code is usable by a second remote control application installed on a second smart device to recreate in the second remote control application the command code set configuration and the input element assignment of the first remote control application installed on the first smart device.

2. The non-transitory, computer-readable media as recited in claim 1, wherein the machine readable code comprises a quick response ("QR") code.

3. The non-transitory, computer-readable media as recited in claim 2, wherein the first data comprises data indicative of at least a brand and type of the at least the first intended target appliance.

4. The non-transitory, computer-readable media as recited in claim 2, wherein the first data comprises an identifier for the at least the first command code set.

5. The non-transitory, computer-readable media as recited in claim 2, wherein the second data comprises user entered data provided to program an activity macro command sequence for use by the first remote control application installed on the first smart device.

6. The non-transitory, computer-readable media as recited in claim 2, wherein the second data comprises user entered data provided to program a favorite channels listing of the first remote control application installed on the first smart device.

* * * * *